US006334910B1

(12) United States Patent
Sato et al.

(10) Patent No.: US 6,334,910 B1
(45) Date of Patent: Jan. 1, 2002

(54) RESIN-COATED STEEL SHEET SUITABLE FOR USE IN THIN-WALLED DEEP-DRAWN IRONED CAN AND STEEL SHEET THEREFOR

(75) Inventors: Taizo Sato; Shigeyoshi Nishiyama, both of Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/701,417

(22) PCT Filed: May 27, 1999

(86) PCT No.: PCT/JP99/02794

§ 371 Date: Mar. 7, 2001

§ 102(e) Date: Mar. 7, 2001

(87) PCT Pub. No.: WO99/63124

PCT Pub. Date: Dec. 9, 1999

(30) Foreign Application Priority Data

May 29, 1998 (JP) .......................................... 10-164471

(51) Int. Cl.[7] ......................... C22C 38/06; C22C 38/02; C22C 38/00; B32B 15/08

(52) U.S. Cl. ....................... 148/320; 148/330; 428/626; 428/681

(58) Field of Search ................................ 148/320, 330, 148/661; 420/8, 121; 428/626, 681

(56) References Cited

U.S. PATENT DOCUMENTS 6,110,299 A * 8/2000 Tosaka et al. .............. 148/320

FOREIGN PATENT DOCUMENTS

| | | |
|---|---|---|
| JP | 2-26349 | * 10/1990 |
| JP | 6-306534 | * 11/1994 |
| JP | 7-258794 | * 10/1995 |

* cited by examiner

*Primary Examiner*—Deborah Yee
(74) *Attorney, Agent, or Firm*—Browdy and Neimark

(57) ABSTRACT

A purpose of the present invention is to provide a resin coated steel sheet with excellent forming, anti surface roughness and corrosion resistances suitable for a thinned, deep drawn and ironed can and a steel sheet therefor, particularly to material suitable for a container for beverage such as pop drink, coffee, tea, fruit juice and so on. Therefore, the material according to the present invention is a steel sheet and a resin covered steel sheet suitable for a thinned, deep-drawn and ironed can comprising Carbon in the range of 0.008% to 0.08%, Silicon of equal or less than 0.05%, Manganese of equal or less than 0.9%, Phosphorous of equal or less than 0.04%, Sulfur of equal or less than 0.04%, Aluminum of equal or less than 0.03%, Nitrogen of equal or less than 0.0035%, residual iron arid unavoidable impurities, wherein the steel sheet is characterized in that an average diameter of crystal grains of the steel sheet before covered with a resin layer is equal or less than 8 μm, an average surface roughness (Ra) is equal or less than 0.5 μm and the maximum surface roughness (Rmax) is equal or less than 5 μm.

4 Claims, 1 Drawing Sheet

RESIN-COATED STEEL SHEET SUITABLE FOR USE IN THIN-WALLED DEEP-DRAWN IRONED CAN AND STEEL SHEET THEREFOR

The present application is the national stage under 35 U.S.C. 371 of PCT/JP99/02794, filed May 27, 1999.

FIELD OF THE INVENTION

The present invention relates to a material for a container suitable for beverage such as pop drink, coffee, tea and fruit drink and so on, particularly to a steel sheet coated with a resin layer suitable for a thinned, deep drawn and ironed can and a steel sheet therefor.

BACKGROUND OF THE INVENTION

As a conventional method for forming a container such as a side-seamless beverage can, there is a DI (Drawn and Ironed) can forming method in which organic coating agent is coated on inner and outer surfaces of a formed can.

Further, there is a complex forming method (deep drawing and ironing method) which is a combination of a DTR (Draw Thinning Redraw) method in which a resin film is previously coated on a metal sheet as smooth forming agent and a metal sheet used as a side wall of a can is thinned only by drawing and the DI method (for example, Japanese Patent Publication NO. HEI 6-312223).

In accordance with these methods, a thickness of a sidewall of a can can be thinned and a total weight of a beverage can can be lightened.

The total weight per one can is still expected to become lighter. To accomplish the above purpose, it has been required to thin a thickness of a steel sheet used for a can (thin gauging).

Therefor, new forming methods have been experimented in addition to the conventional forming methods. For example, there is a modification type of the DI forming method with a previous drawing process and a method of which a thickness reduction ratio is much larger than that of a conventional method.

As described above, a thickness reduction ratios of these new methods are much larger than those of a conventional methods. However baneful influence caused by inclusion existed near a surface of a steel sheet becomes serious although such an influence could be ignored in the conventional method. While a can is formed, inclusion are exposed on the surface of the steel sheet and make damage a resin layer coated on the steel sheet. As the result, the inclusions make baneful influence a substrate of the steel sheet in a view of the corrosion resistance.

Thus, a purpose of the present invention is to provide a steel sheet coated with a resin layer wherein a content ratio of respective inclusion is restricted in a steel sheet and the steel sheet is suitable for a can formed by the DI method with excellent the corrosion resistance and a steel sheet therefore.

DESCLOSURE OF THE INVENTION

A steel sheet used for a resin coated steel sheet suitable as a thinned, deep drawn and ironed can recited in claim 1 of the present invention is characterized of comprising Carbon in the range of 0.008% to 0.08%, Silicon of equal or less than 0.05%, Manganese of equal or less than 0.9%, Phosphorous of equal or less than 0.04%, Sulfur of equal or less than 0.04%, Aluminum of equal or less than 0.03%, Nitrogen of equal or less than 0.0035%, residual iron and unavoidable impurities, wherein the steel sheet is characterized in that an average diameter of crystal grains of the steel sheet before covered with a resin layer is equal or less than 8 μm, an average surface roughness (Ra) is equal or less than 0.5 μm and the maximum surface roughness (Rmax) is equal or less than 5 μm.

A steel sheet used for a resin coated steel sheet suitable as a thinned, deep drawn and ironed can as claimed in claim 2 of the present invention is characterized of comprising Carbon in the range of 0.008% to 0.08%, Silicon of equal or less than 0.05%, Manganese of equal or less than 0.9%, Phosphorous of equal or less than 0.04%, Sulfur of equal or less than 0.04%, Aluminum of equal or less than 0.03%, Nitrogen of equal or less than 0.0035%, Boron in the range of 0.0005% to 0.005%, residual iron and unavoidable impurities, wherein the steel sheet is characterized in that an average diameter of crystal grains of the steel sheet before covered with a resin layer is equal or less than 8 μm, an average surface roughness (Ra) is equal or less than 0.5 μm and the maximum surface roughness (Rmax) is equal or less than 5 μm.

A resin coated steel sheet as claimed in claim 3 of the present invention is characterized in that at least one surface of the steel sheet is covered with a resin layer and the resin coated steel sheet is suitable for a thinned, deep-drawn and ironed can.

BEST MODE FOR CARRYING OUT THE INVENTION

Figure 1:
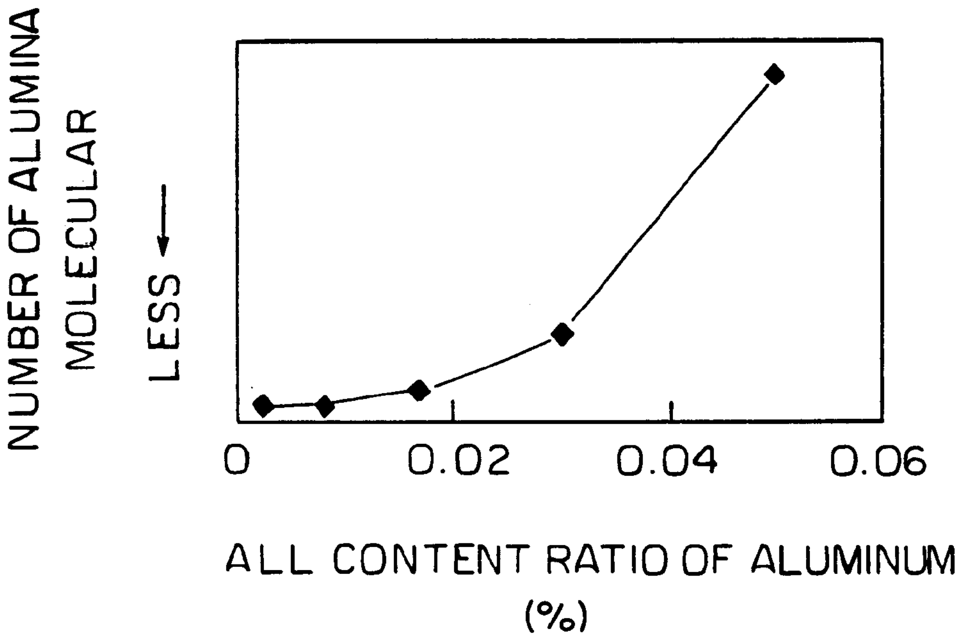
FIG. 1 is a graph for showing a relation between the all content ratio of aluminum and number of alumina molecular.

Chemical Composition of Hot Rolled Steel Sheet

A steel sheet as a material of a resin coated steel sheet according to the present invention comprises carbon (C) in the range of 0.008% to 0.08%, silicone (Si) of 0.05%, manganese (Mn) of equal or less than 0.9%, phosphorous (P) of equal or less than 0.04%, sulfur (S) of equal or less than 0.04%, aluminum (Al) of equal or less than 0.03%, nitrogen (N) of equal or less than 0.0035%, boron (B) in the range of 0.0005% to 0.005%, niobium (Nb) of equal or less than 0.002%, titanium (Ti) of equal or less than 0.002%, residual iron (Fe) and unavoidable impurities. A reason why the content ratios of the material are restricted will be described below.

If the content ratio of carbon is less than 0.08%, a strength of a resin coated steel sheet can not be obtained sufficiently. Therefore, the lower limit should be 0.008%. On the other hand, if the content ratio of carbon is more than 0.08%, a forming characteristic is deteriorated. Therefore, an allowable range of the content ratio of carbon is in the range of 0.008% to 0.08%.

Although silicon is a harmful element in view of deteriorating corrosion resistance as a material for a can, silicon is unavoidably comprised in an aluminum killed steel. Therefore, the upper limit should be 0.05%.

Although manganese is a necessary element in order to prevent from promoting red heat brittleness caused by sulfur in a hot rolling process, a drawing process characteristic is deteriorated in the case that the content ratio exceeds 0.9%. Therefore, the upper limit of manganese should be 0.9%.

Phosphorus is an effective element in order to micronize crystal grains and to improve strength of the material. On the other hand, phosphorus makes deteriorate the corrosion resistance. If the content ratio of phosphorous is more than 0.04%, the corrosion resistance, particularly an anti-perforating characteristic is remarkably deteriorated. Therefore, the upper limit should be 0.04%.

Sulfur is impurity for promoting red heat brittle in a hot rolling process. It is preferable the content ratio of sulfur as less as possible. However, sulfur is unavoidable element. Therefore, the upper limit should be 0.04%.

Aluminum is an element to be added to a steel bath as deoxidizing agent. If an additive amount of aluminum is too less, stable deoxidizing effect can not be obtained. If the additive amount is too much, excess aluminum molecular react with oxygen in the material and inclusion of $Al_2O_3$ are formed. A size of the inclusion of $Al_2O_3$ is too small, that is, less than dozens $\mu$m. While a steel is manufactured, the produced inclusion can not be removed sufficiently. Thus, the inclusion is remained near a surface of the steel. When the DI method is processed, the inclusion would injure a surface of a resin layer covered steel sheet and deteriorate the corrosion resistance after forming a can.

In the present invention, aluminum is a very important element in addition to the above described reason.

In a conventional art, the corrosion resistance of a beverage can has been improved by controlling a diameter of crystal grains and roughness of material such as steel sheet. Although it has been considered the deterioration of the corrosion resistance caused by the inclusion in a steel sheet, it has not become a serious problem since a thickness of a can is relatively thick.

Nowadays, a total weight of a can becomes lighter and lighter. A thickness of the steel sheet becomes thinner and an ironing amount becomes larger than that of a conventional process. Thus, a corrosion resistance influenced by inclusion near a surface of the steel sheet, particularly to inclusion of alumina-system become serious problem although it had not been any problems in the conventional art.

Micro inclusion of alumina-system are observed at a surface of the steel sheet which is processed by a high cold rolling ratio. Micro inclusion of alumina-system existed under the surface of the steel sheet before a drawing process can be exposed at the surface of the can after the ironing process. Upon experimenting a reduction of the inclusion of alumina-system, the following results can be obtained.

It has been understood that dozens ppm of oxygen is in a steel sheet and the oxygen reacts with aluminum so as to produce alumina. Conventionally, a size of inclusion is too small to baneful influence a mechanical characteristic and corrosion resistance. However, lighter the total weight of the can becomes, more serious the baneful influence of alumina which had not been harmful becomes.

Upon experimenting a relation between the content amount of the all aluminum and number of alumina in the steel sheet, it is cleared that the number of alumina is increased while the content amount of the all aluminum becomes as shown in FIG. 1. If the all content amount of the all aluminum exceeds 0.03%, it is cleared that the number of alumina is rapidly increased.

Figure 2:
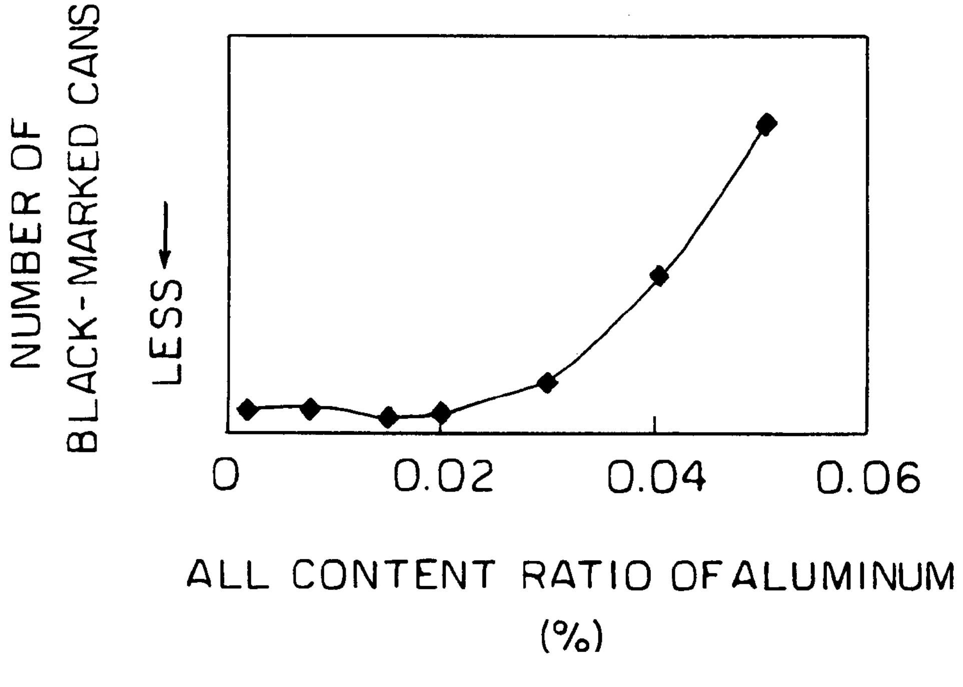
FIG. 2 is a graph for showing a relation between the all content ratio of aluminum and number of black-marked cans.

Cans are manufactured by resin coated steel sheets of which steel sheets have different content amount of the all aluminum each other and formed by the DI forming method. The corrosion resistance of each can is evaluated. The result thereof is shown in FIG. 2. As shown in FIG. 2, number of cans of which a surface is marked with black point(s) is rapidly increased and the corrosion resistance is remarkably deteriorated in the case of the content amount of the all aluminum exceeding 0.03%. Therefore, in the present invention, it is preferable that the content amount of the all aluminum remained in each steel sheet is equal or less than 0.03%, wherein the present invention, an amount of aluminum means a content amount of the all aluminum.

In the case of a content ratio of nitrogen exceeding 0.0035%, a steel sheet is harden by solution strengthening so that a forming characteristic is baneful influenced. Therefore, the content ratio should be equal or less than 0.0035%.

Boron is a useful component for reducing the content ratio of solution nitrogen, since boron produces nitride. Upon comparing boron and aluminum as a nitride forming element, boron makes nitride easier than aluminum and BN is precipitated in a hot rolling step.

However, in the case that the boron amount is less than 0.0005%, an effect caused by producing nitride is insufficient. Nitrogen can not be fixed completely. It would be afraid of being occurred stretcher strain caused by yield point extending at a bottom portion of a formed can. On the other hand, extra additive of boron makes a steel sheet strengthen by solution strength and the anisotropy becomes enhanced. Therefore the upper limit should be 0.005%.

Although a slab heating temperature can not be determined by the present invention, hot rolling characteristics are deteriorated in the case that the slab heating temperature is less than 1100° C. In view of the hot rolling characteristics, it is preferable that the slab heating temperature is higher than 1100° C. If the slab heating temperature is too high, nitride is promoted to be degraded and soluble again. It is preferable that the slab heating temperature is lower than 1220° C.

A condition of the hot rolling process can not be specified. A furnishing temperature is not considered as a reason of any problems so as to form a can if the furnishing temperature is equal or more than Ar3. However, if the furnishing temperature is lower than 850° C., the anisotropy is deteriorated in a view of forming a can. Therefore, it is preferable that the furnishing temperature is equal or higher than 850° C.

It is considered that a lower limit of a coiling temperature is 550° C. in view of quality stability in a width direction and a longitudinal direction of a coiled coil in a hot rolling process. If the coiling temperature is higher than 680° C., descaling characteristic is deteriorated, diameters of crystal grains become rough and big, and rough surface is occurred. Therefore, it is preferable that the coiling temperature is in the range of 550° C. to 680° C.

First Cold Rolling

If a draft of the first cold rolling is less than 75%, crystal grains of the steel sheet are increased and various sized grains are mixed in an annealing process. The crystal grains of the steel sheet can not be micronized sufficiently. Therefore, it is preferable that the ratio of the cold rolling is more than 75%.

Continuous Annealing

It is necessary that an annealing temperature of the continuous annealing is higher than a re-crystallization temperature. However, if the annealing temperature is too high, crystal grains become too rough and large. After thinning and deep drawing process, a degree of surface roughness becomes more serious.

Therefore, it is preferable that the temperature is less than 750° C. In the continuous annealing process, averaging treatment is acceptable.

Second Cold Rolling

If a ratio of the second cold rolling is from 0.5% to 30%, a can can be formed with sufficient strength. A forming characteristic can not be baneful influenced. If the ratio is less than 0.5%, the strength of the can is insufficient and stretcher strain caused by yield point extending is occurred at a bottom portion of the can. Thus, an ornament effect is damaged. If the ratio of the second cold rolling is higher than 30%, the forming characteristic is baneful influenced during forming a can so that a can having a sufficient height can not be obtained. Alternatively, during forming a can, the can would be induced to be broken. Thus, a productivity would be baneful influenced.

Average Diameter of Crystal Grain

An average diameter of crystal grains of a steel sheet (material) is specified by peeling surfaces of cans. In order to evaluate a surface of the cans, the each can is formed by deep drawing and ironing a resin coated steel sheet of which an average diameter of crystal grain is different each other. As the result, it is understood that surface roughness of formed cans are proper in the case that the average diameter of the crystal grain is equal or less than 8 μm. Therefore, the average diameter of the crystal grains should be equal or less than 8 μm. The surface roughness of a steel sheet in forming can is important in view of evaluating adhesion deterioration between a steel sheet and a resin layer covered on the steel sheet. It is important to specify the average diameter of crystal grain of a steel sheet before covered with a resin layer.

Surface Roughness

In the case that a can is made of a resin coated steel sheet, surface roughness is important in view of evaluating an adhesive characteristic of a resin layer coated on a steel sheet. In addition, it is also important to specify the surface roughness of the steel late before covered with a resin layer. The surface roughness can be controlled by the second cold rolling process. The surface roughness of the steel sheet can be freely controlled by varying a surface roughness of rollers. The surface roughness of the steel sheet is heavily influenced to the adhesion characteristic of the coated resin during forming. Particularly, the adhesion between the resin layer and the steel sheet is seriously influenced by the surface roughness of the steel sheet. If an average surface roughness (Ra) of the steel sheet is more than 0.5 μm, the adhesion between the steel sheet and the resin layer is deteriorated. Thereby, a peeling phenomenon is occurred at the coated resin layer while the steel sheet is processed so as to form a can. In order to maintain an corrosion resistance, average surface roughness (Ra) should be equal or less than 0.5 μm. Regarding the maximum surface roughness (Rmax), a excellent corrosion resistance can be obtained in the case that the maximum surface roughness is less than 0.5 μm similarly.

Regarding the steel sheet according to the present invention, it is recommended a sheet-type steel sheet, coil-type steel sheet, steel foil and surface treated steel sheets using these sheets. As a surface treatment, for example, tinning, nickel plating, zinc plating, electrolytic chromic treatment and mixture thereof and alloying treatment therefore are considered. Thermal diffusion treatment after the described surface treatment is also considered. Particularly, a proper surface treatment with respect to a resin coated steel sheet is an electrolytic chromic treatment having a double-layered structure in which a lower surface of the steel sheet is treated with metal chromium and the upper surface of the steel sheet is treated with chromium hydo-oxide.

Regarding resin coated on a steel sheet, copolymer of one kind or more than one kind of polyethylene, polypropylene, polyester, polyamide, polycarbonate, polyvinylchloride, polyvinylidene chloride, acrylic resin or resin blended with two or more than of said resins is considered. These thermoplastic resins have various characteristics, such as heat-resistant characteristic, corrosion resistance, forming, adhesion, respectively. Resin is selected in accordance with a target purpose. For example, as a material used for forming a DTR can in which a steel sheet is stretch formed and ironed, polyester, particularly polyethylene terephthalate, copolymer of polyester mainly including ethylene terephthalate, polyester mainly including butylene terephthalate and resin mixed thereof is preferable. It is preferable a resin film biaxial oriented having a thickness in the range of 5 to 50 μm. Further, if an anti-shock processing characteristic is required, a film made from the above polyester blended with bisphenol A polycarbonate, a double Layered film in which an upper layer is made from the above mixed resin and a lower layer is made from the above polyester and three layered film in which an upper layer and a lower layer are made from polyester and an intermediate layer is made from bisphenol A polycarbonate are preferable.

These resin are utilized as a resin film biaxial oriented. These resin film may be used by contacting a metal sheet heated more than a melting point of the resin with the resin so as to cover the metal sheet under pressure or by heating and melting these resin and directly extruded on a metal sheet so as to cover the metal sheet and others. In the case that an adhesion after forming of the resin layer with respect to the metal sheet and the corrosion resistance are insufficient, thermosetting resin such as epoxy resin may be used as an adhesive between the resin layer and the metal sheet.

The result of the embodiments according to the present invention is shown in Table 1. In Table 1, the first embodiment to the sixth embodiment are belonged to a range specified in the present invention. The both of the forming and the corrosion resistance are sufficient. The comparative example 7 and 8 are not belonged to the range specified in the present invention and poor in the corrosion resistance. The corrosion resistance is evaluated as follows.

A can is formed by a resin coated steel sheet according to the present invention. The can is heated at 130° C. for 20 minute. After filling water into the can, the can is maintained at 37° C. for 2 weeks. A result whether black points are occurred at an inner surface of the can is evaluated through naked eyes. Unless any black points can be observed, the can is evaluated as “good”. If the black points are observed, the can is evaluated as “poor”.

TABLE 1

| Example or Comparative example | chemical composition (wt %) C | Mn | P | S | Al | N | B | properties: Average diameter of crystal grain | Surface roughness Ra (μm) | Rough surface | Black point | corrosion resistance |
|---|---|---|---|---|---|---|---|---|---|---|---|---|
| Example 1 | 0.042 | 0.20 | 0.010 | 0.010 | 0.006 | 0.0022 | — | 6.1 | 0.34 | good | none | good |
| Example 2 | 0.042 | 0.22 | 0.010 | 0.010 | 0.010 | 0.0022 | — | 6.0 | 0.18 | good | none | good |
| Example 3 | 0.025 | 0.38 | 0.015 | 0.013 | 0.008 | 0.0018 | — | 7.5 | 0.39 | good | none | good |
| Example 4 | 0.037 | 0.20 | 0.009 | 0.008 | 0.014 | 0.0021 | 0.0027 | 7.0 | 0.21 | good | none | good |
| Example 5 | 0.067 | 0.19 | 0.017 | 0.007 | 0.011 | 0.0028 | — | 5.5 | 0.14 | good | none | good |
| Example 6 | 0.043 | 0.18 | 0.006 | 0.014 | 0.025 | 0.0012 | — | 6.2 | 0.19 | good | none | good |
| Comparative example 7 | 0.042 | 0.22 | 0.008 | 0.012 | 0.054 | 0.0019 | — | 5.9 | 0.21 | good | exist | poor |
| Comparative example 8 | 0.005 | 0.35 | 0.010 | 0.009 | 0.006 | 0.0030 | 0.0002 | 9.5 | 0.26 | poor | none | poor |
| Comparative example 9 | 0.058 | 0.23 | 0.008 | 0.003 | 0.043 | 0.0017 | — | 6.6 | 0.78 | poor | exist | poor |

Possibility of Use in Industry

A resin coated steel sheet according to the present invention provides an acceptable range of alumina content in the steel sheet so that the steel sheet can have excellent forming, anti surface roughness, corrosion resistance suitably used for a thinned, deep drawn and ironed can utilized for beverage such as pop drink, coffee, tea, fruit juice and so on. A can made of a resin coated steel sheet according to the present invention is very light.

What is claimed is:

1. A steel sheet used for a resin coated steel sheet suitable as a thinned, deep drawn and ironed can comprising:

Carbon in the range of 0.008% to 0.08%, Silicon of equal or less than 0.05%, Manganese of equal or less than 0.9%, Phosphorous of equal or less than 0.04%, Sulfur of equal or less than 0.04%, Aluminum of equal or less than 0.03%, Nitrogen of equal or less than 0.0035%, residual iron and unavoidable impurities, wherein the steel sheet is characterized in that an average diameter of crystal grains of the steel sheet before covered with a resin layer is equal or less than 8 μm, an average surface roughness (Ra) is equal or less than 0.5 μm and the maximum surface roughness (Rmax) is equal or less than 5 μm.

2. A steel sheet used for a resin coated steel sheet suitable as a thinned, deep drawn and ironed can comprising:

Carbon in the range of 0.008% to 0.08%, Silicon of equal or less than 0.05%, Manganese of equal or less than 0.9%, Phosphorous of equal or less than 0.04%, Sulfur of equal or less than 0.04%, Aluminum of equal or less than 0.03%, Nitrogen of equal or less than 0.0035%, Boron in the range of 0.0005% to 0.005%, residual iron and unavoidable impurities, wherein the steel sheet is characterized in that an average diameter of crystal grains of the steel sheet before covered with a resin layer is equal or less than 8 μm, an average surface roughness (Ra) is equal or less than 0.5 μm and the maximum surface roughness (Rmax) is equal or less than 5 μm.

3. A resin coated steel sheet wherein at least one surface of the steel sheet as claimed in claim 1 is covered with a resin layer and the resin coated steel sheet is suitable for a thinned, deep-drawn and ironed can.

4. A resin coated steel sheet wherein at least one surface of the steel sheet as claimed in claim 2 is covered with a resin layer and the resin coated steel sheet is suitable for a thinned deep-drawn and ironed can.

* * * * *